United States Patent
Singh et al.

(10) Patent No.: US 12,160,753 B2
(45) Date of Patent: *Dec. 3, 2024

(54) TELECOMMUNICATIONS NETWORK COVERAGE OPTIMIZATION SYSTEM

(71) Applicant: T-Mobile USA, Inc., Bellevue, WA (US)

(72) Inventors: Gurpreet Singh, Manteca, CA (US); Stephen Todd Vancleve, Walnut Creek, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 293 days.

This patent is subject to a terminal disclaimer.

(21) Appl. No.: 17/554,595

(22) Filed: Dec. 17, 2021

(65) Prior Publication Data
US 2023/0199514 A1 Jun. 22, 2023

(51) Int. Cl.
| | |
|---|---|
| *H04W 16/22* | (2009.01) |
| *H04W 4/021* | (2018.01) |
| *H04W 16/18* | (2009.01) |
| *H04W 24/02* | (2009.01) |
| *H04W 24/10* | (2009.01) |

(52) U.S. Cl.
CPC ........... *H04W 16/22* (2013.01); *H04W 4/021* (2013.01); *H04W 16/18* (2013.01); *H04W 24/02* (2013.01); *H04W 24/10* (2013.01)

(58) Field of Classification Search
CPC ..... H04W 16/22; H04W 4/021; H04W 16/18; H04W 24/02; H04W 24/10; H04W 4/02; H04W 24/08
See application file for complete search history.

(56) References Cited

U.S. PATENT DOCUMENTS

| | | |
|---|---|---|
| 5,734,709 A | 3/1998 | Dewitt et al. |
| 5,987,322 A | 11/1999 | Gupta et al. |
| 6,112,091 A | 8/2000 | Puijenbroek et al. |
| (Continued) | | |

FOREIGN PATENT DOCUMENTS

| | | | | |
|---|---|---|---|---|
| WO | WO-2014056342 A1 | * | 4/2014 | ............ H04W 16/18 |
| WO | WO-2020098575 A1 | * | 5/2020 | ............ H04W 16/18 |
| WO | WO-2023061253 A1 | * | 4/2023 | |

*Primary Examiner* — Deepa Belur
(74) *Attorney, Agent, or Firm* — Perkins Coie LLP

(57) ABSTRACT

Systems and methods for telecommunications network coverage optimization are disclosed. The network coverage optimization system computes a usability index value for a geographic area using measured values of telecommunications network usability indicators. The telecommunications network usability indicators are related to network coverage (e.g., whether the user has enough bars and can make a call), quality of service (e.g., whether the speech and data quality are good), and data speed (e.g., the amount of buffering the user is experiencing). The telecommunications network usability indicators can be selected based on an importance rating associated with them. Then, for each geographic area, the network coverage optimization system computes a score value and a weight value for each selected telecommunications network usability indicator. Using the computed score values and the computed weight values, the network coverage optimization system computes a usability index value for the geographic area.

20 Claims, 13 Drawing Sheets

(56) References Cited

U.S. PATENT DOCUMENTS

| | | |
|---|---|---|
| 6,343,290 B1 | 1/2002 | Cossins et al. |
| 6,396,810 B1 | 5/2002 | Hebel |
| 6,697,477 B2 | 2/2004 | Fleischer et al. |
| 6,912,270 B1 | 6/2005 | Drury et al. |
| 6,914,525 B2 | 7/2005 | Rao et al. |
| 7,725,108 B2 | 5/2010 | Vincent |
| 7,840,219 B2 | 11/2010 | Ludovico et al. |
| 8,036,664 B2 | 10/2011 | Khetawat et al. |
| 8,150,397 B2 | 4/2012 | Khetawat et al. |
| 8,204,502 B2 | 6/2012 | Khetawat et al. |
| 8,355,600 B1 | 1/2013 | Haught et al. |
| 8,447,810 B2 | 5/2013 | Roumeliotis et al. |
| 8,472,950 B2 | 6/2013 | Bao et al. |
| 8,526,961 B2 | 9/2013 | Sanders et al. |
| 8,560,670 B2 | 10/2013 | Mcnaughton et al. |
| 8,615,255 B1 | 12/2013 | Zang et al. |
| 9,042,254 B2 | 5/2015 | Soulie |
| 9,071,705 B2 | 6/2015 | Isaksson |
| 9,119,059 B2 | 8/2015 | Pison et al. |
| 9,286,705 B1 | 3/2016 | Haught et al. |
| 9,363,146 B2 | 6/2016 | Cossins et al. |
| 9,408,118 B2 | 8/2016 | Karimli et al. |
| 9,408,180 B2 | 8/2016 | Karimli et al. |
| 9,462,613 B2 | 10/2016 | Klatt |
| 9,599,476 B2 | 3/2017 | Mund et al. |
| 9,706,411 B2 | 7/2017 | Goswami et al. |
| 9,763,169 B2 | 9/2017 | Mcquaid |
| 9,774,994 B2 | 9/2017 | Chen et al. |
| 10,187,268 B2 | 1/2019 | Cossins et al. |
| 10,225,746 B2 | 3/2019 | Mohammed et al. |
| 10,229,415 B2 | 3/2019 | Huyi et al. |
| 10,341,878 B2 | 7/2019 | Bertrand et al. |
| 10,375,516 B2 | 8/2019 | Colonna et al. |
| 10,397,737 B2 | 8/2019 | Colonna et al. |
| 10,489,806 B2 | 11/2019 | Nadiadi et al. |
| 10,490,890 B2 | 11/2019 | Kolokotronis |
| 10,531,309 B1 | 1/2020 | Li et al. |
| 10,555,191 B1 | 2/2020 | Jat et al. |
| 10,555,192 B2 | 2/2020 | Yang et al. |
| 10,601,684 B2 | 3/2020 | Hashmi et al. |
| 10,623,256 B2 | 4/2020 | Zawadzki et al. |
| 10,631,198 B2 | 4/2020 | Zhang |
| 10,644,979 B2 | 5/2020 | Samadi |
| 10,687,230 B2 | 6/2020 | Mueller et al. |
| 10,735,962 B2 | 8/2020 | Mohammed et al. |
| 10,779,183 B2 | 9/2020 | Li et al. |
| 10,785,123 B2 | 9/2020 | Gonguet |
| 10,791,468 B2 | 9/2020 | Raj et al. |
| 10,808,502 B2 | 10/2020 | Yang et al. |
| 10,817,889 B2 | 10/2020 | Zachariah et al. |
| 10,970,724 B2 | 4/2021 | Halstead et al. |
| 10,979,910 B2 | 4/2021 | Li et al. |
| 10,993,081 B2 | 4/2021 | Mehran et al. |
| 11,006,307 B2 | 5/2021 | Yoon |
| 11,089,485 B2 | 8/2021 | Wainer et al. |
| 11,653,292 B2 | 5/2023 | Azizi et al. |
| 2002/0027567 A1 | 3/2002 | Niamir |
| 2002/0183075 A1 | 12/2002 | Fauconnier |
| 2003/0112954 A1 | 6/2003 | Fleischer et al. |
| 2004/0075552 A1 | 4/2004 | Rao et al. |
| 2004/0102893 A1 | 5/2004 | Atkinson et al. |
| 2004/0260720 A1 | 12/2004 | Cossins et al. |
| 2007/0026886 A1 | 2/2007 | Vincent |
| 2008/0037497 A1 | 2/2008 | Ludovico et al. |
| 2008/0076419 A1 | 3/2008 | Khetawat et al. |
| 2008/0076425 A1 | 3/2008 | Khetawat et al. |
| 2008/0305792 A1 | 12/2008 | Khetawat et al. |
| 2009/0055719 A1 | 2/2009 | Cossins et al. |
| 2009/0196185 A1 | 8/2009 | Stipanovich et al. |
| 2010/0009671 A1 | 1/2010 | Goldman et al. |
| 2010/0056163 A1 | 3/2010 | Schmidt et al. |
| 2010/0069086 A1 | 3/2010 | Ahlin |
| 2011/0314145 A1 | 12/2011 | Raleigh et al. |
| 2012/0077523 A1 | 3/2012 | Roumeliotis et al. |
| 2012/0284737 A1 | 11/2012 | Savoor et al. |
| 2012/0295536 A1 | 11/2012 | Klatt |
| 2013/0005297 A1 | 1/2013 | Sanders et al. |
| 2013/0040672 A1 | 2/2013 | Pison et al. |
| 2013/0115943 A1 | 5/2013 | Bao et al. |
| 2013/0179224 A1 | 7/2013 | Nadiadi et al. |
| 2013/0182590 A1 | 7/2013 | Soulie |
| 2013/0331109 A1* | 12/2013 | Dhillon ................ H04W 24/02 |
| | | 455/446 |
| 2014/0163875 A1 | 6/2014 | Mund et al. |
| 2014/0378093 A1 | 12/2014 | Isaksson |
| 2015/0187099 A1 | 7/2015 | Huyi et al. |
| 2015/0257050 A1 | 9/2015 | Karimli et al. |
| 2015/0257124 A1 | 9/2015 | Karimli et al. |
| 2016/0165517 A1 | 6/2016 | Mcquaid |
| 2016/0328120 A1 | 11/2016 | Smith |
| 2016/0335695 A1 | 11/2016 | Gokhale et al. |
| 2017/0019795 A1* | 1/2017 | Takahashi ............ H04W 16/18 |
| 2017/0064605 A1 | 3/2017 | Wang et al. |
| 2017/0078412 A1 | 3/2017 | Wentz |
| 2017/0150365 A1 | 5/2017 | Goswami et al. |
| 2017/0171763 A1 | 6/2017 | Mueller et al. |
| 2017/0367022 A1 | 12/2017 | Chandrasekaran |
| 2018/0124566 A1 | 5/2018 | Colonna et al. |
| 2018/0197188 A1 | 7/2018 | Halstead et al. |
| 2018/0220307 A1 | 8/2018 | Mohammed et al. |
| 2018/0227795 A1* | 8/2018 | Sung ..................... H04W 24/04 |
| 2019/0087840 A1 | 3/2019 | Zachariah et al. |
| 2019/0150006 A1 | 5/2019 | Yang et al. |
| 2019/0150026 A1* | 5/2019 | Zhang ............... H04W 28/0289 |
| | | 370/229 |
| 2019/0200241 A1 | 6/2019 | Mohammed et al. |
| 2019/0379592 A1 | 12/2019 | Samadi |
| 2019/0380050 A1 | 12/2019 | Mueller et al. |
| 2019/0392054 A1 | 12/2019 | Courtemanche et al. |
| 2020/0024930 A1 | 1/2020 | Yang et al. |
| 2020/0028746 A1 | 1/2020 | Zawadzki et al. |
| 2020/0029240 A1 | 1/2020 | Li et al. |
| 2020/0092732 A1 | 3/2020 | Raj et al. |
| 2020/0162336 A1 | 5/2020 | Gonguet |
| 2020/0186473 A1 | 6/2020 | Serrano Garcia et al. |
| 2020/0213900 A1 | 7/2020 | Zhang |
| 2020/0267058 A1 | 8/2020 | Gray et al. |
| 2020/0267505 A1 | 8/2020 | Mehran et al. |
| 2020/0275285 A1 | 8/2020 | Li et al. |
| 2020/0344694 A1 | 10/2020 | Jangid et al. |
| 2020/0351698 A1 | 11/2020 | Li et al. |
| 2020/0404523 A1 | 12/2020 | Yoon |
| 2021/0037394 A1 | 2/2021 | Wainer et al. |
| 2021/0065226 A1 | 3/2021 | Zachariah et al. |
| 2021/0209136 A1 | 7/2021 | Jha et al. |
| 2021/0377788 A1* | 12/2021 | Yoon .................. H04W 28/0284 |
| 2023/0138578 A1 | 5/2023 | Azizi et al. |
| 2023/0199511 A1* | 6/2023 | Singh ................... H04W 16/18 |
| | | 370/230 |
| 2023/0289444 A1* | 9/2023 | Ermey .................. G06F 21/552 |

\* cited by examiner

FIG. 8D

TELECOMMUNICATIONS NETWORK COVERAGE OPTIMIZATION SYSTEM

CROSS REFERENCE TO RELATED APPLICATION(S)

This application is related to U.S. application Ser. No. 17/554,952, filed on Dec. 17, 2021, the contents of which are incorporated by reference in their entirety.

BACKGROUND

A telecommunications network is established via a complex arrangement and configuration of many cell sites that are deployed across a geographical area. For example, there can be different types of cell sites (e.g., macro cells, micro cells, and so on) positioned in a specific geographical location, such as a city, a neighborhood, and so on. These cell sites strive to provide adequate, reliable coverage for mobile devices (e.g., smart phones, tablets, and so on) via different frequency bands and radio networks such as a Global System for Mobile (GSM) mobile communications network, a code/time division multiple access (CDMA/TDMA) mobile communications network, a third or fourth generation (3G/4G) mobile communications network (e.g., General Packet Radio Service (GPRS/EGPRS)), Enhanced Data rates for GSM Evolution (EDGE), a Universal Mobile Telecommunications System (UMTS), or Long Term Evolution (LTE) network, a 5G mobile communications network, IEEE 802.11 (WiFi), or other communications network. The devices can seek access to the telecommunications network for various services provided by the network, such as services that facilitate the transmission of data over the network and/or provide content to the devices.

As device usage continues to rise at an impressive rate, there are too many people using too many network—and/or data-hungry applications in places where the wireless edge of the telecommunications network has limited or no capacity. As a result, most telecommunications networks have to contend with issues of network congestion. Network congestion is the reduced quality of service that occurs when a network node carries more data than it can handle. Typical effects include queueing delay, packet loss, and the blocking of new connections, resulting in an overall degraded customer experience. As a result, a customer's experience with a network suffers and often results in a customer switching telecommunications service providers.

BRIEF DESCRIPTION OF THE DRAWINGS

FIGS. 8A-8E are example reports illustrating analysis of data relating to optimizing coverage in a telecommunications network.

Figure 1:
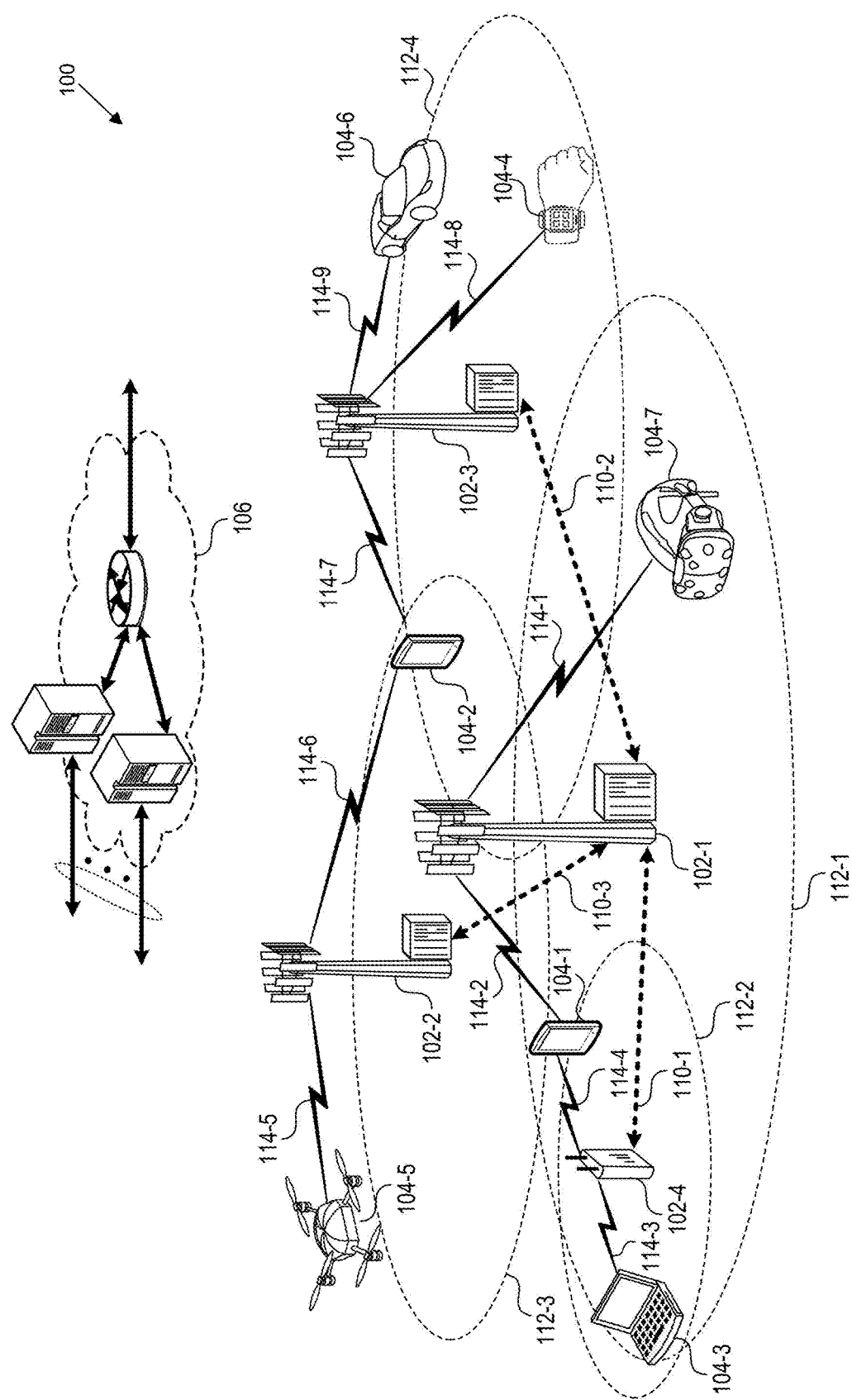
FIG. 1 is a block diagram that illustrates a wireless telecommunication system.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

Telecommunications network providers typically evaluate the health of their network using a coverage map that displays network availability and speed in various geographic regions. While coverage maps provide average data for customers in a region, they fail to provide information about actual customer experience. For example, while a customer's mobile device might show multiple bars, indicating a strong signal, the actual customer experience may not be optimal/positive (e.g., even with multiple bars indicating a strong signal strength, the user may still suffer from dropped calls). As a result, telecommunications network providers are unable to accurately determine the usability of their network at different locations, thus providing suboptimal network coverage to their customers.

To solve these and other problems, the inventors have developed a telecommunications network coverage optimization system ("network coverage optimization system") and method to compute a telecommunications network usability score ("usability index") for various locations that better represents telecommunications network user experience. The network coverage optimization system computes a usability index value for a geographic area (e.g., sector, cell site, city, zip code, state, region, etc.) using measured values of telecommunications network usability indicators. The telecommunications network usability indicators are related to network coverage (e.g., whether the user has enough bars and can make a call), quality of service (e.g., whether the speech and data quality are good), and data speed (e.g., the amount of buffering the user is experiencing). The telecommunications network usability indicators can be selected based on an importance rating associated with them. Then, for each geographic area, the network coverage optimization system computes a score value and a weight value for each selected telecommunications network usability indicator. Using the computed score values and the computed weight values, the network coverage optimization system computes a usability index value for the geographic area.

In this manner, the network coverage optimization system provides an area-holistic solution that enables a telecommunications network provider to identify locations with suboptimum coverage, predict future coverage problems for certain locations, and recommend solutions (e.g., adding a cell site, deploying a small cell, etc.) to optimize telecommunications network coverage in identified locations.

In the following description, for the purposes of explanation, numerous specific details are set forth in order to provide a thorough understanding of implementations of the present technology. It will be apparent, however, to one skilled in the art, that implementations of the present technology can be practiced without some of these specific details.

The phrases "in some implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs, including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "geographic coverage area 112" or collectively as "geographic coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed or unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG); wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the physical (PHY) layer, the transport channels are mapped to physical channels.

As illustrated, the wireless devices 104 are distributed throughout the network 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), or a wearable device (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home, a portable gaming console, or a wirelessly connected sensor that provides data to a remote server over a network.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

Communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions, while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and can carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
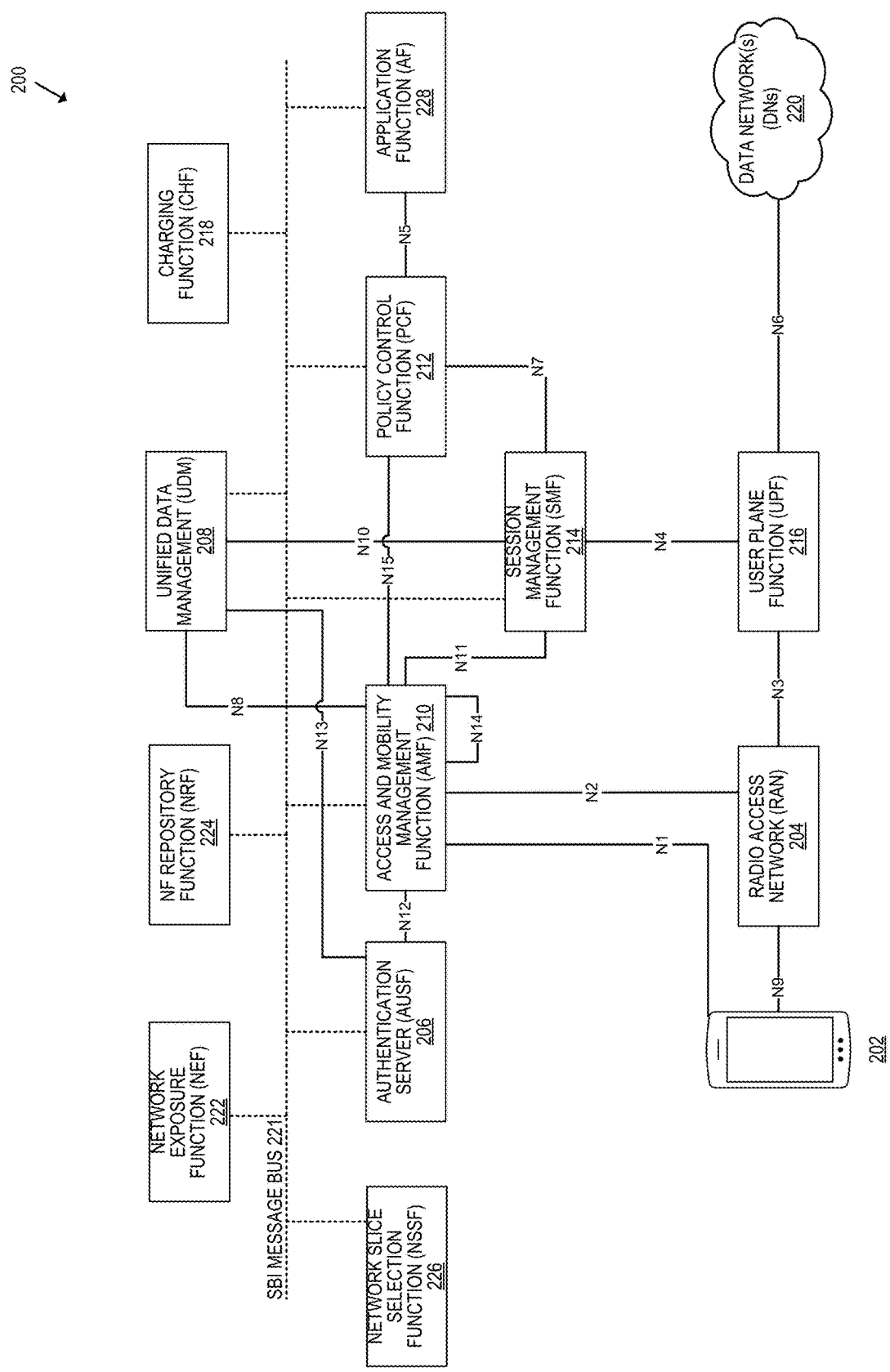
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a Radio Access Network (RAN) 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane, and the AMF 210, SMF 214, PCF 212, AUSF 206, and UDM 208 are part of the control plane. One or more UPFs 216 can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements, and it includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), in that it provides authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge computing cloud environment and a single point of entry for a cluster of network functions once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface (between the AMF 210 and the SMF 214 assigned by the NRF 224) use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical Quality of Service (QOS) and charging rules, includes network slice selection, which is regulated by the NSSF 226.

The Network Coverage Optimization System

Figure 3:
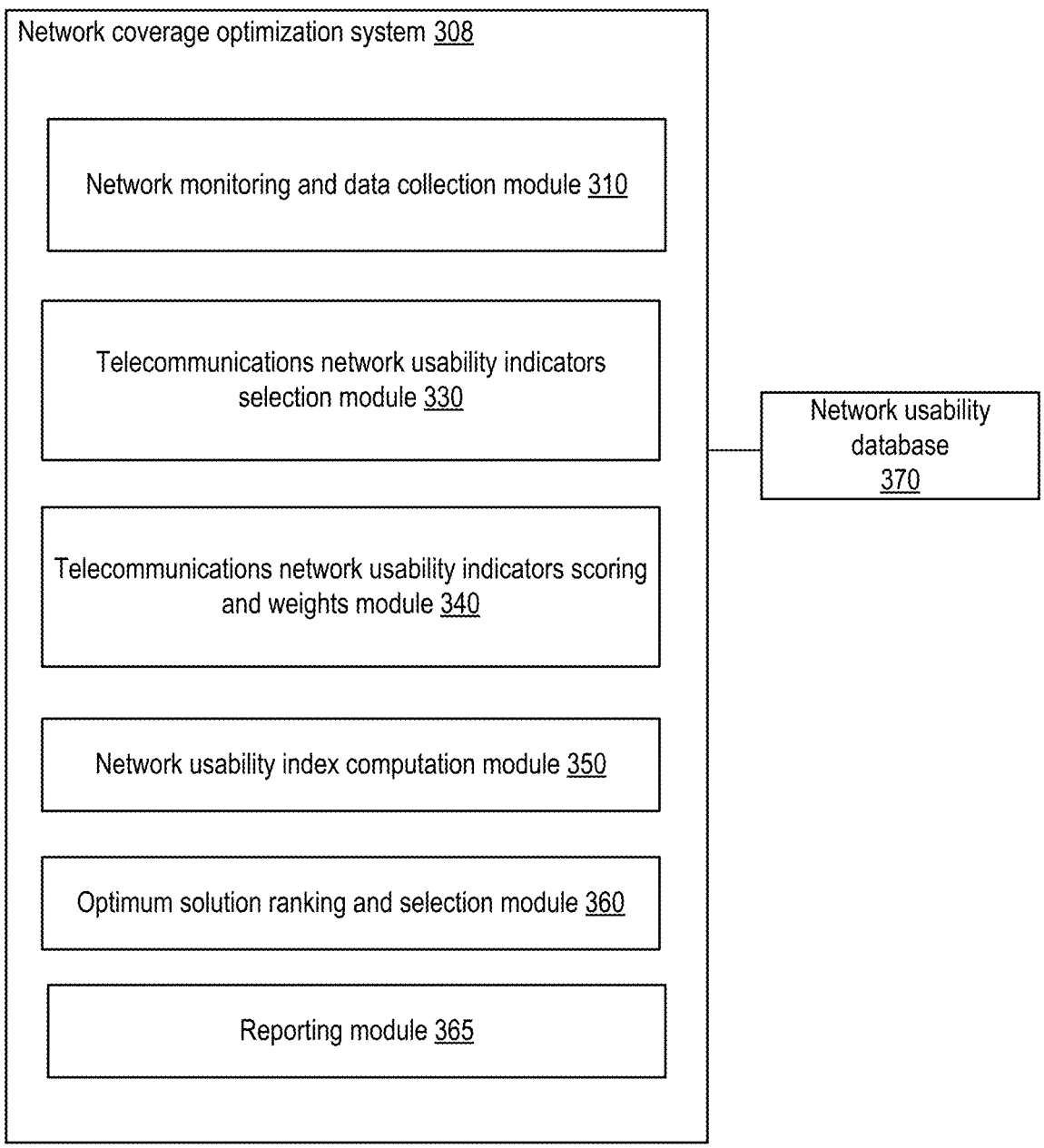
FIG. 3 is a block diagram that illustrates components of a network coverage optimization system.

FIG. 3 is a block diagram that illustrates components of a network coverage optimization system 308. The network coverage optimization system 308 can include functional modules that are implemented with a combination of software (e.g., executable instructions or computer code) and hardware (e.g., at least a memory and processor). Accordingly, as used herein, in some examples a module is a processor-implemented module or set of code, and it represents a computing device having a processor that is at least temporarily configured and/or programmed by executable instructions stored in memory to perform one or more of the specific functions described herein. For example, the network coverage optimization system 308 can include a network monitoring and data collection module 310, a telecommunications network usability indicators selection module 330, a telecommunications network usability indicators scoring and weights module 340, a network usability index computation module 350, an optimum solution ranking and selection module 360, and a reporting module 365, each of which is discussed separately below.

Network Monitoring and Data Collection Module

The network monitoring and data collection module 310 is configured and/or programmed to monitor telecommunications network data for a geographic area and extract, from that data, values of one or more network usability indicators. The network monitoring and data collection module 310 can monitor and extract the values of the network usability indicators before a particular network performance improvement solution is deployed (pre-solution deployment), after the particular network performance improvement solution is deployed (post-solution deployment), or both.

The network monitoring and data collection module 310 collects/receives/accesses one or more of the following data records associated with the performance indicators (which can be stored in a network usability database 370): location specific records (LSR), call data records (CDRs), timing advance values, RF signal data, distance between the customer and at least one telecommunications network site, strength of signal, quantity of data used, type of device of the customer, applications data (e.g., application type, name, owner, manager, data sent/received/used/saved, bandwidth used, APIs accessed, etc.), source of usage records (for example, telecommunications service provider, third party, application owner, etc.). Examples of other types of data collected by the network monitoring and data collection module 310 include, but are not limited to, data collected from third-party applications (e.g., including crowdsourced data) that can help to determine customer experience with location. For example, the network monitoring and data collection module 310 can collect information about a user's location using his/her social media posts (e.g., tweets, check-ins, posts, etc.). As another example, the network monitoring and data collection module 310 collects application-level data (e.g., collected using applications related to IoT devices, sensors, billing meters, traffic lights, etc.) to identify the user location and/or data related to the performance indicators. In some implementations, the network monitoring and data collection module 310 monitors and/or collects data records corresponding to particular time periods, such as morning, afternoon, evening, busy hours, and so on. The busy hour time period can vary for different geographic areas based on factors such as density of records, frequency of user complaints, frequency of network coverage issues, and so on. For example, the busy hour time period can correspond to rush hour in a geographic area. In some implementations, the telecommunications network data for a geographic area is monitored at a cell level. The network monitoring and data collection module 310 can aggregate the cell-level telecommunications network data into sector-level telecommunications network data.

Telecommunications Network Usability Indicators Selection Module

The telecommunications network usability indicators selection module 330 is configured and/or programmed to select a set of network usability indicators from a set of performance indicators (PIs). The set of PIs comprises hundreds (for example, 200-300) of performance indicators, each of which can be used to measure an aspect of performance of a specific geographic area (e.g., a cell site, sector, zip code, hex bin, region, state, country, and so on). For example, the set of PIs can include some or all of the following performance indicators: leakage, throughput, level of coverage (LOC), Reference Signal Received Power (RSRP), Reference Signal Received Quality (RSRQ), dropped-call rate (DCR), traffic, number of users, Physical Resource Block (PRB) utilization, Channel Quality Indicator (CQI), carrier aggregation, advanced Quadrature Amplitude Modulation (QAM), radio resource control (RRC) users, downlink speed, uplink speed, network measurement, types of handsets, customer payment history, access failures, geographic locations of sectors in the set of sectors, number of sectors used, number of cell sites used, and so on.

From this set of numerous performance indicators, the telecommunications network usability indicators selection module 330 selects a set of network usability indicators to be used to evaluate network coverage and project impact/performance of various network performance improvement solutions. The telecommunications network usability indicators in the set of telecommunications network usability indicators correspond to at least one of the following: telecommunications network coverage, quality of service, or data speed. The telecommunications network usability indicators selection module 330 selects the subset of network usability indicators based on one or more of the following factors: correlation of each network usability indicator with customer experience, correlation of each network usability indicator with other network usability indicators, user (for example, administrator) preference, telecommunications service provider preference, and so on. For instance, the telecommunications network usability indicators selection module 330 selects performance indicators that exhibit a low degree of correlation yet reflect the dimensions of the overall composite. For example, the network usability indicators selection module 330 selects the following network usability indicators as components of the set of network usability indicators: downlink speed, uplink speed, accessibility (VAFR), coverage, leakage, retainability (e.g., measured by SIP DCR), and LOC. Alternatively or additionally, the telecommunications network usability indicators selection module 330 selects a top threshold number of performance indicators having a maximum correlation with the customer experience. In some implementations, the telecommunications network usability indicators selection module 330 selects the set of network usability indicators based on principal component analysis.

Telecommunications Network Usability Indicators Scoring and Weights Module

Figure 5:
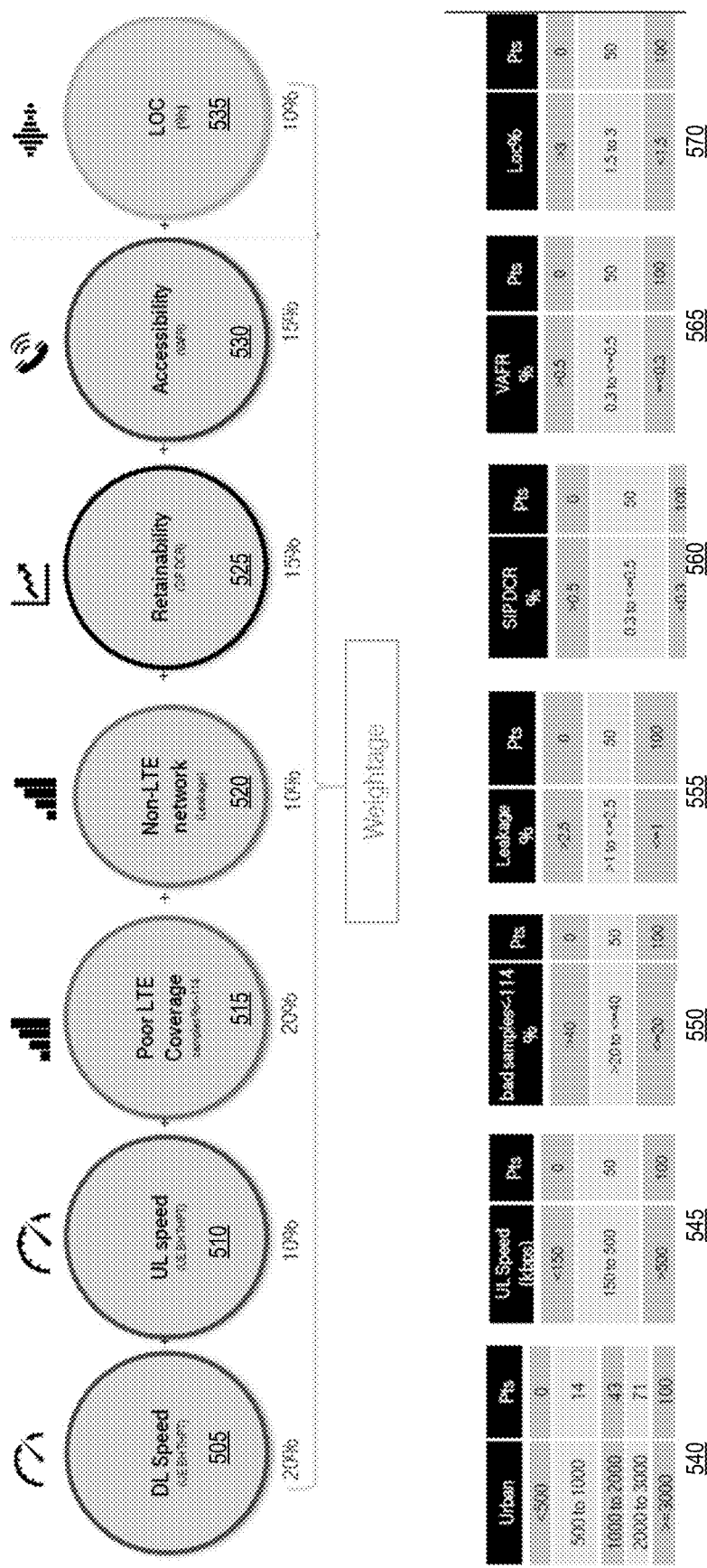
FIGS. 5-7 are example diagrams illustrating processes (or components of processes) of optimizing coverage in a telecommunications network.

The telecommunications network usability indicators scoring and weights module 340 is configured and/or programmed to compute scores and weights for the network usability indicators in the set of network usability indicators. The telecommunications network usability indicators scoring and weights module 340 computes the weights that reflect the relative importance of the network usability indicators and/or minimize interdependence of network usability indicators in the set of network usability indicators (for example, to avoid double counting). The telecommunications network usability indicators scoring and weights module 340 can compute the weights based on principal component analysis. For example, as illustrated in FIG. 5, the network coverage optimization system 308 selects and computes weights for the following network usability indicators: downlink speed 505, uplink speed 510, LTE coverage 515, non-LTE coverage (leakage) 520, retainability 525, accessibility 530, and LOC 535, number of users per sector, and so on.

Additionally, the telecommunications network usability indicators scoring, and weights module 340 computes score values for the network usability indicators in the set of network usability indicators. To compute the score values, the telecommunications network usability indicators scoring and weights module 340 can use a range-based approach where, depending on the data range in which a value of the network usability indicator falls, the telecommunications network usability indicators scoring and weights module 340 assigns a corresponding score or point to the network usability indicator. For example, the telecommunications network usability indicators scoring and weights module 340 uses the ranges and points listed in tables 540, 545, 550, 555, 560, 565, and 570 (FIG. 5) to compute a score value for the different network usability indicators respectively. The system can determine the data range bounds (e.g., <500, 500 to 1000, 1000 to 2000, and so on in table 540) based on one or more factors, such as customer needs, applications (e.g., YouTube®, TikTok®, and so on), telecommunications service provider preferences, and so on. In some implementations, the ranges are determined based on one or more of the following factors: user experience of applications, distribution, and so on. For example, when ranges can change over time when more good sectors are identified in the network. The system can determine the point/score values corresponding to the different data range bounds based on a desired/expected outcome.

Network Usability Index Computation Module

Figure 6:
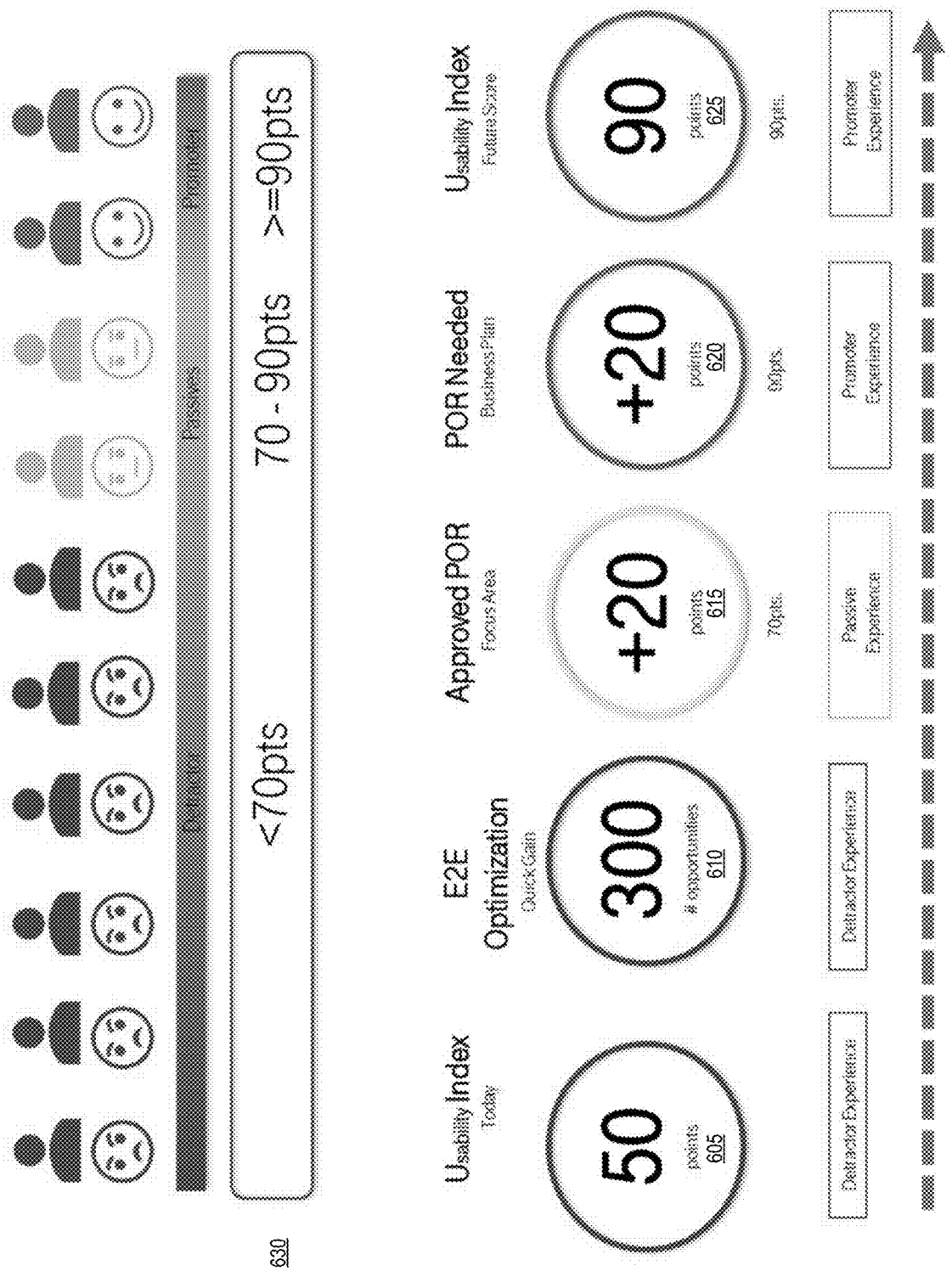

The network usability index computation module 350 is configured and/or programmed to compute an overall telecommunications network usability score for a geographic area. To compute the overall telecommunications network usability score for the geographic area, the network usability index computation module 350 uses score values and the weights of the telecommunications network usability indicators in the set of telecommunications network usability indicators. For example, as depicted in FIG. 6, the network usability index computation module 350 computes the overall telecommunications network usability score for a geographic area using the following formula:

Usability score$_{geographic\ area}$= $\Sigma$Weight$_{indicator}$*Score$_{indicator}$ In some implementations, the network usability index computation module 350 uses the formula listed above to compute usability scores for different bands—e.g., low band and mid band. The network usability index computation module 350 can then compute a combined overall telecommunications network usability score for a geographic area using the following formula:

$$\text{Usability score}_{geographic\ area} = \frac{(\text{Usability Score}_{mid-band} * \text{Number of users}_{mid-band}) + (\text{Usability Score}_{low-band} * \text{Number of use})}{\text{Number of users}_{mid-band} + \text{Number of users}_{low-band}}$$

By computing a combined overall telecommunications network usability score in the manner discussed above, the system can ensure a more accurate and reliable usability score computation because, for example, when a majority of users/customers have good experience on mid band, the overall user experience is expected to also be good.

Further, the network usability index computation module 350 can classify a geographic area as a detractor area, a passive area, or a promoter area based on the value of the computed overall telecommunications network usability score for the geographic area (FIG. 6, 630). For example, an area is classified as a detractor area when its usability score is less than a threshold value (e.g., 70), which means that customers in that area have a will have terrible experience. Similar, other threshold and/or ranges can be used for the other classifications (e.g., areas with usability score between 70-90 are classified as passive areas and areas with usability score greater than 90 are classified as promoter areas). In addition, the network usability index computation module 350 can determine the number of customers in the geographic who are having a detractor experience, a passive experience, or a promoter experience.

Optimum Solution Ranking and Selection Module

The optimum solution ranking and selection module 360 is configured and/or programmed to enable selection of one (or more) network performance improvement solutions/actions to deploy at particular geographic areas/sites. Examples of network performance improvement solutions include, but are not limited to, cell split, small cell deployment, spectrum addition, spectrum removal, sector addition, sector removal, overlays/site mod for example L2100, Anchor solutions, L1900, and so on. The optimum solution ranking and selection module 360 evaluates the usability scores computed for various geographic areas to identify and select one or more solutions as candidates for deployment at a site (for example, region, market, or sector) associated with that area. The optimum solution ranking and selection module 360 can compute the impact of deploying a solution on individual network usability indicator values/scores and/or the overall telecommunications network usability score for the geographic area. In some implementations, the optimum solution ranking and selection module 360 evaluates the impact of short-term solutions, medium-term solutions, and long-term solutions to identify an optimum set of solutions to select for the geographic area.

Figure 7:
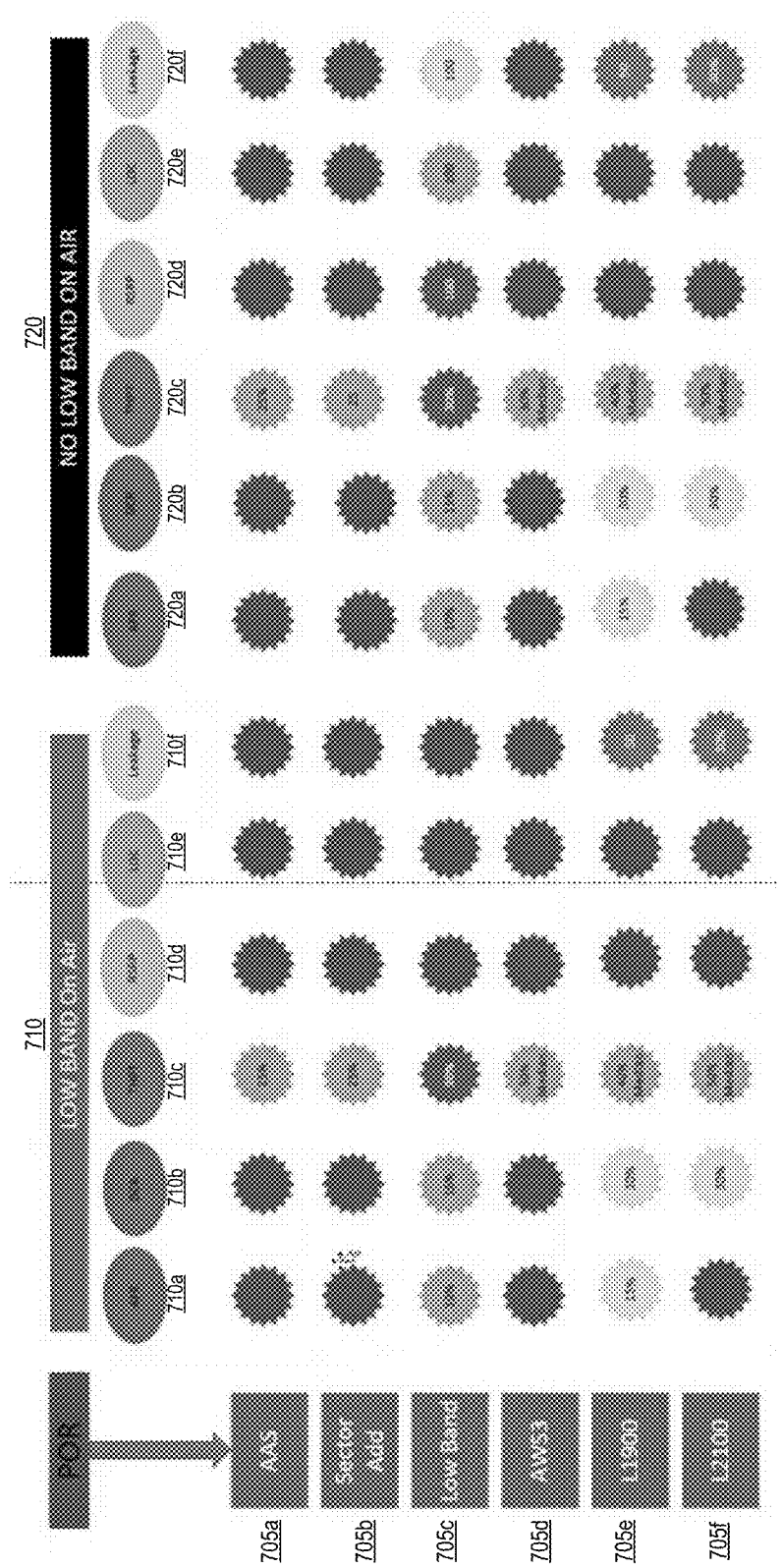

FIG. 7 illustrates the impact of various plan of record (POR) solutions 705a-705f on the individual network usability indicator values/scores (710a-710f and 720a-720f) for two different geographic areas, 710 (with low band on Air) and 720 (with no low band on Air). As illustrated in FIG. 7, the existing sites were divided into two buckets: sites with low band and sites without low band. A solution deployed on a low band site will likely bring a different impact to the usability score for the area as compared to when the solution was deployed at a non-low band site. For example, deploying a low band solution to a mid band only site will result in improved network coverage for that area because the footprint of the cell site is increased. However, deploying a low band solution on a low band site will likely not improve coverage for that area. In this manner, a service provider is able to identify the optimum solutions for deployment at different sites/areas.

The solutions can be ranked in the order of decreasing impact on usability score. In some implementations, the optimum solution ranking and selection module 360 selects the best-performing solution (for example, small cell). As illustrated in FIG. 6, the optimum solution ranking and selection module 360 can identify and/or display the following: current usability score 605 for a geographic area, number of network improvement solutions/opportunities 610 identified for the geographic area, change in usability score upon deployment of approved POR solutions 615, change in usability score upon deployment of additional network improvement solutions 620, and projected usability score 625. The system can compute the performance KPIs improvement like leakage, RSRP, Speed, lack of coverage and project the usability score based on that improvement. The following information can also be stored/displayed about the network performance improvement solutions: solutions count (total number of sites/sectors where the solution is deployed) and percentage of sites/sectors where the gain was greater than a threshold value (for example, zero).

In addition to evaluating the impact on usability score of various solutions, the optimum solution ranking and selection module 360 can consider one or more of the following additional factors when ranking and/or selecting optimum solutions: location of the telecommunications network site, lease information of the telecommunications network site, duration of deployment of the network performance improvement solution, entitlements and permits required to deploy the network performance improvement solution, tower height, nearest available site, population served by the telecommunications network site, households served by the telecommunications network site, rental costs associated with the network performance improvement solution, backhaul availability, cost and duration factors (e.g., cost of deploying a network performance improvement solution, cost of maintaining the network performance improvement solution, expected lifetime of the network performance improvement solution, duration of deploying the network performance improvement solution, lifetime of the network performance improvement solution), similarity between the site where a solution was deployed and the site where the solution is to be deployed, solutions deployed at sites in a selected geographic area, and so on. For example, while the optimum solution ranking and selection module 360 initially selects a small cell solution as an optimum solution based on the impact on usability score, it can update its selection to a sector add solution based on the costs and duration of deployment associated with the various solutions (small cell solutions tend to be more expensive and take a longer time to deploy, as compared to sector add solutions).

Reporting Module

Figure 8A:
Figure 8B:
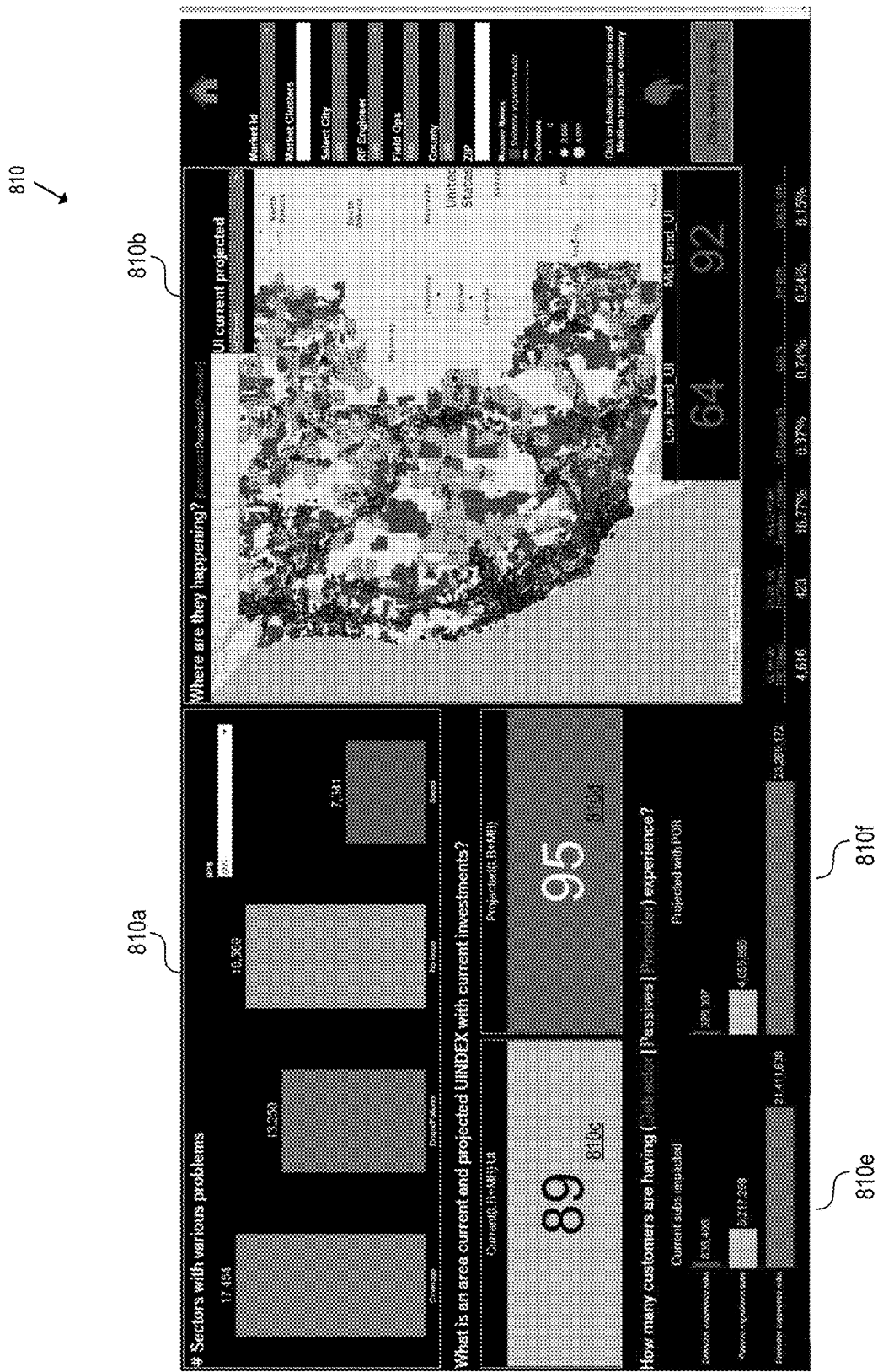
Figure 8C:
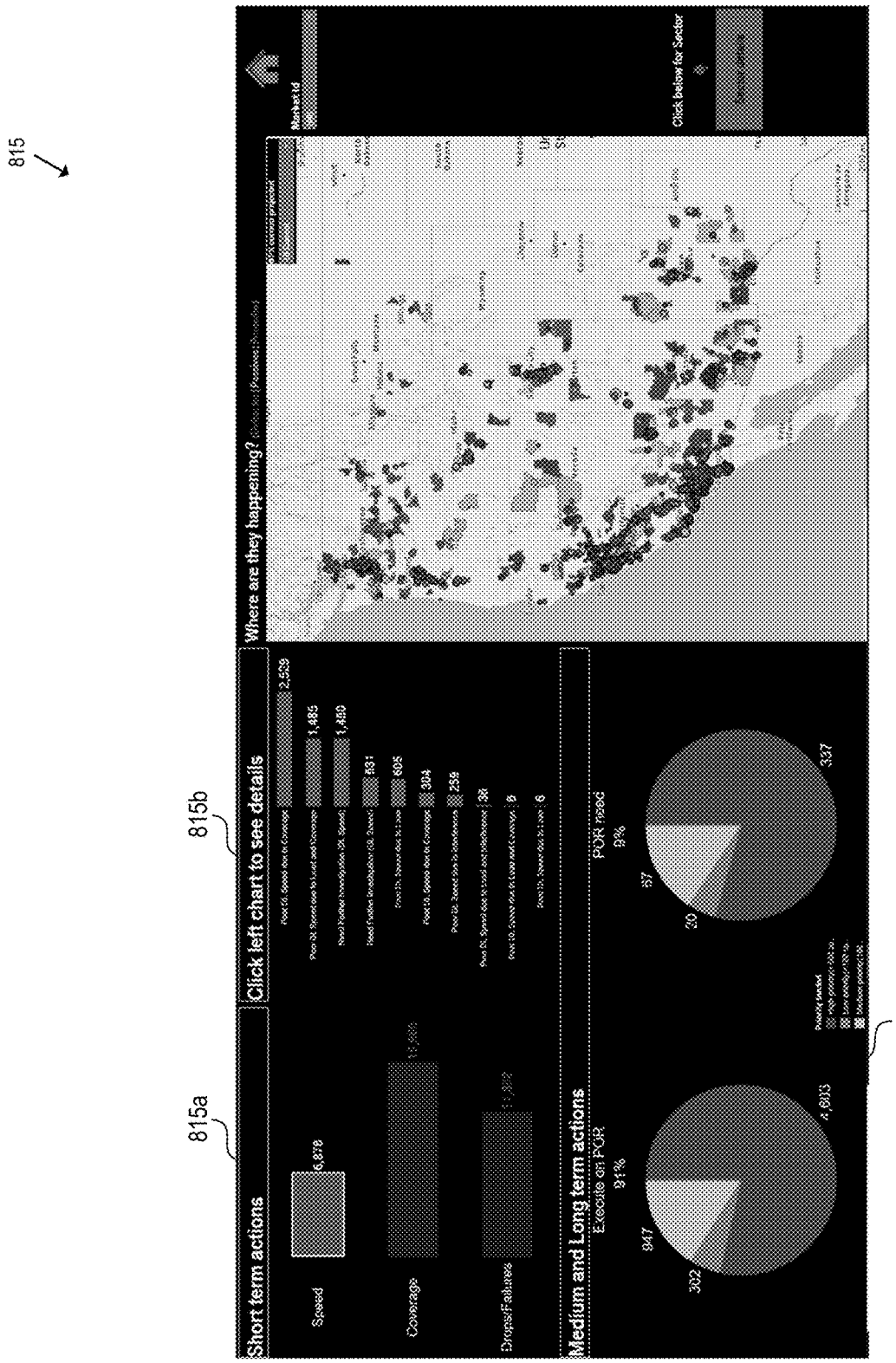

The reporting module 365 is configured and/or programmed to generate one or more reports that can be displayed at a user interface. FIGS. 8A-8E are example reports illustrating analysis of data relating to optimizing coverage in a telecommunications network. FIG. 8A illustrates a report 805 that displays the usability scores of different geographic areas, such as MWA, NCA, PNW, PW, and Tri LA. In addition, it displays the distribution of user experiences in an area and the proportion of users per classification type (e.g., detractor, passive, and promoter). For example, report 805 displays that 766.9K customers are in detractor experience and this priority can go all the way to the county or cell level. A service provider can use the information illustrated in report 805 to identify areas (e.g., counties or markets) with high priority and click on them to drill down and see more details. Report 805 further enables a user to further drill down into details of an area to see details, such as those illustrated in FIG. 8B FIG. 8B illustrates a report 810 that displays a current and projected view for a geographic area. For example, report 810 can display a section 810a illustrating the number of sectors in a geographic area and the percentage of sectors that are contributing towards certain types of problems (e.g., speed problems, coverage problems, retainability problems, and accessibility problems). In addition, report 810 can display a map (810b) plotting the customers and their experience types (detractor experience, passive experience, and promoter experience) for the geographic area. Report 810 can further display the current usability index 810c of the geographic area and the projected usability index 810d of the geographic area, as well as the number of customers currently having the various experiences (810e) and the customers projected to have the various experiences (810f). User can select at market level, city level, county level, and so on to understand the current and projected user experience based on PORs. FIG. 8C illustrates a report 815 that displays the impact of various network performance improvement solutions/actions when deployed at particular areas/sites. For example, report 815 displays the impact of one or more short-term actions (815a) on different indicator values related to customer experience categories, such as speed, coverage, and drops/failures. Report 815 enables a user to select a particular customer experience category (e.g., speed) to see additional details (815b). Report 815 can further display the impact of medium- and long-term actions 815c. A user can click on a coverage to view the cause(s) of coverage issues (815b). By selecting control 815, a user can view the number of problems that can be resolved by executing on POR and identify areas that need further PORs.

Figure 8D:
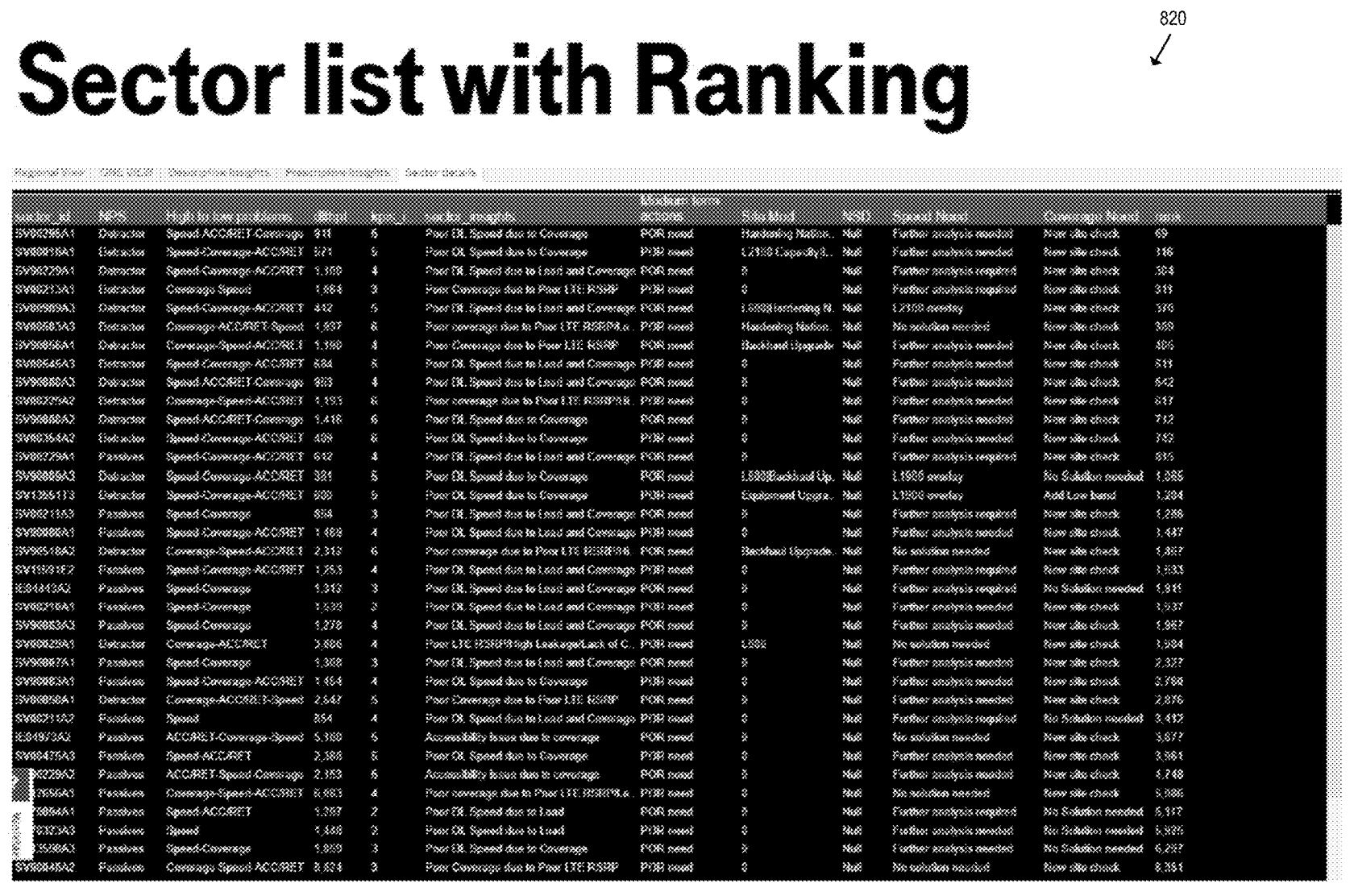
Figure 8E:
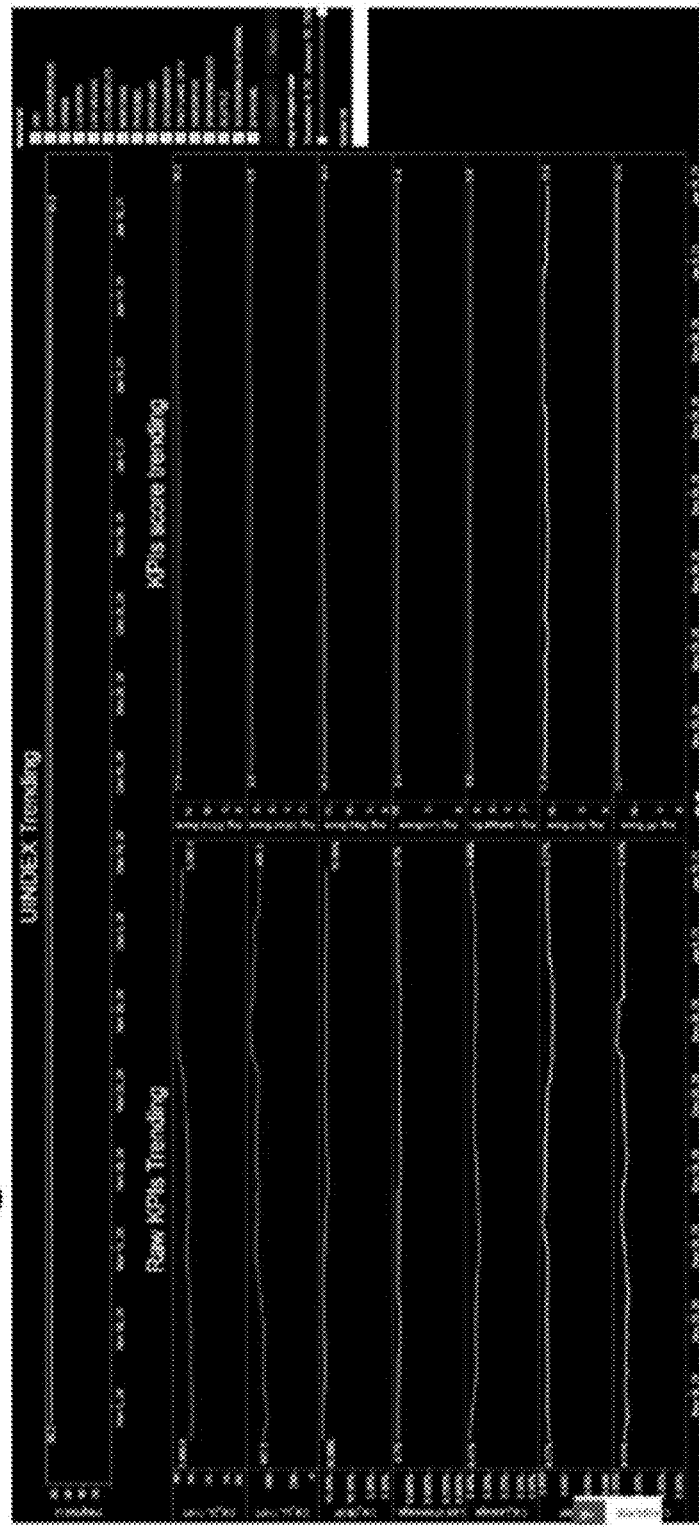

FIG. 8D illustrates a report 820 that displays various sectors in a geographic area and their associated details, such as sector identifier, area categorization (detractor, passive, promoter), summary of problems, recommended network performance improvement solutions/actions to deploy at the sector/geographic area, rank, and so on. The sectors in report 820 can be sorted based on their priority rank values. FIG. 8E illustrates a report 825 that displays trendlines of values and/or scores of various network usability indicators for one or more geographic areas.

Flow Diagrams

Figure 4:
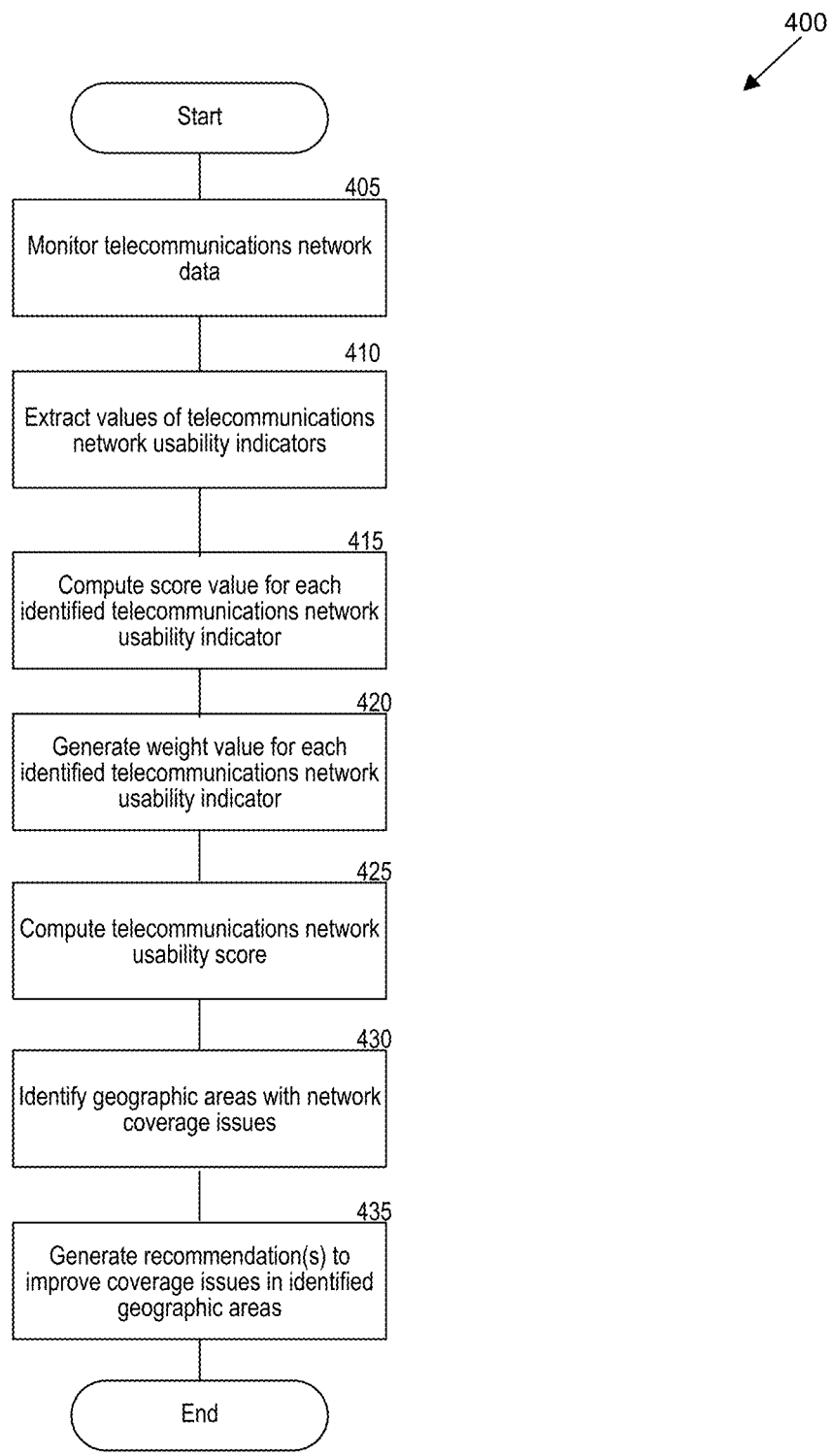
FIG. 4 is a flow diagram illustrating a process of optimizing coverage in a telecommunications network.

FIG. 4 is a flow diagram illustrating a process of optimizing coverage in a telecommunications network. At block 405, process 400 monitors telecommunications network data (e.g., for a geographic area). At block 410, process 400 extracts, from the telecommunications network data, values of a set of telecommunications network usability indicators. The telecommunications network usability indicators in the set of telecommunications network usability indicators correspond to at least one of the following: telecommunications network coverage, quality of service, or data speed. At block 415, process 400 computes, using the extracted values, score values of each telecommunications network usability indicator in the set of telecommunications network usability indicators. At block 420, process 400 generates a weight for each telecommunications network usability indicator in the set of telecommunications network usability indicators. Using the score values and the weights of the telecommunications network usability indicators in the set of telecommunications network usability indicators, at block 425, process 400 computes an overall telecommunications network usability score for the geographic area. At block 430, process 400 uses the computed overall telecommunications network usability score to identify whether the geographic area has any network coverage issues (for example, when the overall telecommunications network usability score and/or individual score values of one or more telecommunications network usability indicators are outside predetermined threshold bounds). Additionally or alternatively, process 400 can classify the geographic area as a detractor area, a passive area, or a promoter area based on the computed overall telecommunications network usability score. At block 435, process 400 can use the computed overall telecommunications network usability score for the geographic area to provide data for selecting an optimum network performance improvement solution to be implemented at the geographic area to improve coverage issues and/or to move the geographic area from a detractor area to a passive area/promoter area or from a passive area to a promoter area.

Computer System

Figure 9:
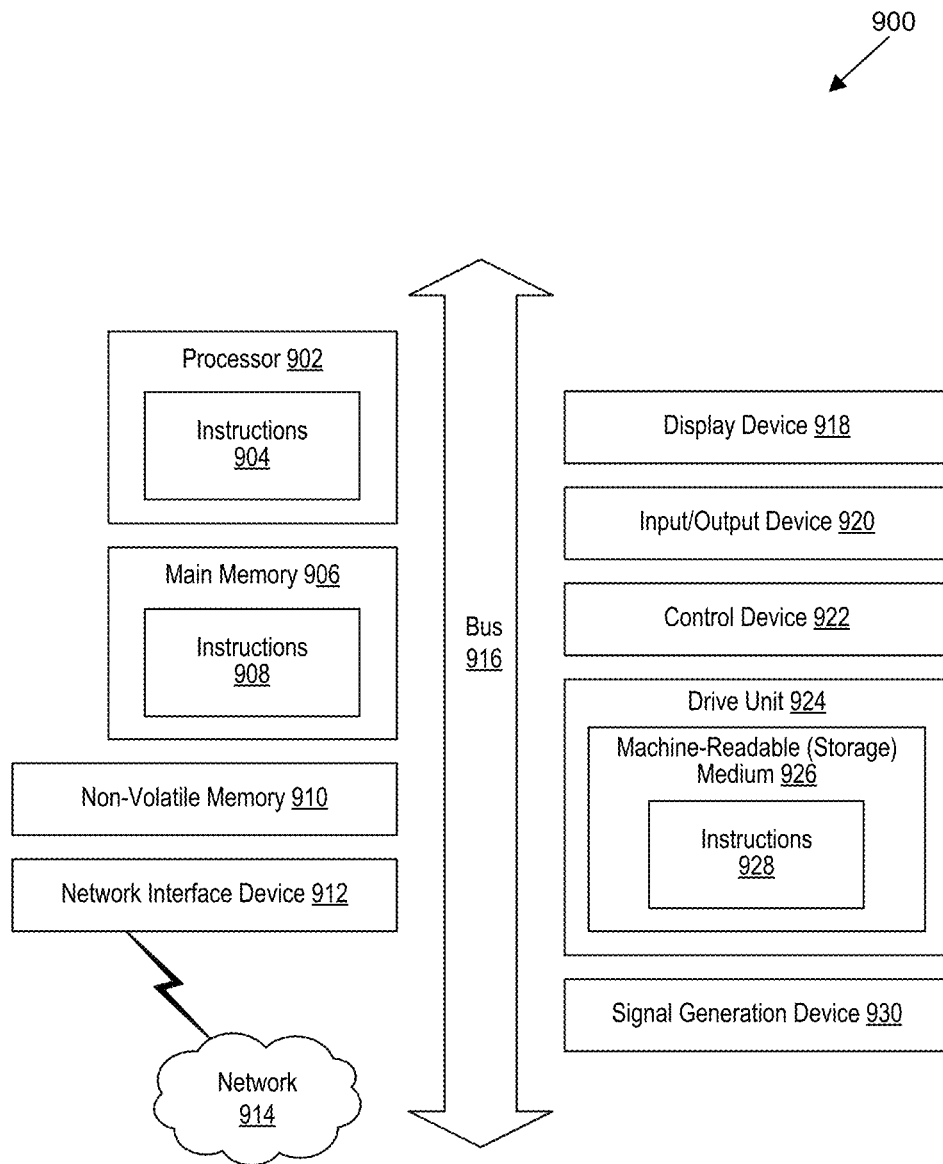
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include one or more processors 902, main memory 906, non-volatile memory 910, a network interface device 912, a display device 918, an input/output device 920, a control device 922 (e.g., a keyboard and pointing device), a drive unit 924 that includes a machine-readable (storage) medium 926, and a signal generation device 930, all of which are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computer system 900 can have an architecture similar to that of a server computer, personal computer (PC), tablet computer, mobile telephone, game console, music player, wearable electronic device, network-connected ("smart") device (e.g., a television or home assistant device), AR/VR system (e.g., head-mounted display), or any electronic device capable of executing a set of instructions that specify action(s) to be taken by the computer system 900. In some implementations, the computer system 900 can be an embedded computer system, a system-on-chip (SOC), a single-board computer system (SBC), or a distributed system such as a mesh of computer systems, or it may include one or more cloud components in one or more networks. Where appropriate, one or more computer systems 900 can perform operations in real time, in near real time, or in batch mode.

The network interface device 912 enables the computer system 900 to mediate data in a network 914 with an entity that is external to the computer system 900 through any communication protocol supported by the computer system 900 and the external entity. Examples of the network interface device 912 include a network adaptor card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 906, non-volatile memory 910, and machine-readable (storage) medium 926) can be local, remote, or distributed. Although shown as a single medium, the machine-readable (storage) medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computer system 900. The machine-readable (storage) medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computer system 900 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations can perform routines having blocks, or employ systems having blocks, in a different order, and some processes or blocks can be deleted, moved, added, subdivided, combined, and/or modified to provide alternatives or subcombinations. Each of these processes, message/data flows, or blocks can be implemented in a variety of different ways. Also, while processes or blocks are at times shown as being performed in series, these processes or blocks can instead be performed in parallel or can be performed at different times. Further, any specific numbers noted herein are only examples: alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements. The teachings of the methods and system provided herein can be applied to other systems, not necessarily the system described above. The elements, blocks, and acts of the various implementations described above can be combined to provide further implementations.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicants contemplate various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicants reserve the right to pursue such additional claim forms in either this application or in a continuing application.

These and other changes can be made to the invention in light of the above Detailed Description. While the above description describes certain implementations of the technology and describes the best mode contemplated, no matter how detailed the above appears in text, the invention can be practiced in many ways. Details of the system can vary considerably in their implementation while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

The invention claimed is:

1. A system for identifying geographic areas in which to improve telecommunications network congestion, the system comprising:
   at least one hardware processor;
   at least one non-transitory memory, coupled to the at least one hardware processor and storing instructions, which, when executed by the at least one hardware processor, perform a process, the process comprising:
      monitoring telecommunications network data for a geographic area;
      extracting, from the telecommunications network data, values of a set of telecommunications network usability indicators,
         wherein the telecommunications network usability indicators in the set of telecommunications network usability indicators correspond to at least one of the following:
      telecommunications network coverage, quality of service, or data speed;
      computing, using the extracted values, score values of each telecommunications network usability indicator in the set of telecommunications network usability indicators;
      generating a weight for each telecommunications network usability indicator in the set of telecommunications network usability indicators;
      computing an overall telecommunications network usability score for the geographic area using the score values and the weights of the telecommunications network usability indicators in the set of telecommunications network usability indicators; and
      using the computed overall telecommunications network usability score for the geographic area to provide data for selecting an optimum network performance improvement solution from a set of network performance improvement solutions to be implemented in at least one network site or node in the geographic area.

2. The system of claim 1, wherein the instructions, when executed by the at least one hardware processor, further perform a process comprising classifying the geographic area as a detractor area, a passive area, or a promoter area using the computed overall telecommunications network usability score for the geographic area.

3. The system of claim 1, wherein the process monitors the telecommunications network data for the geographic area during one or more busy hours.

4. The system of claim 1, wherein the set of telecommunications network usability indicators comprises:
   leakage,
   throughput,
   level of coverage (LOC),
   Reference Signal Received Power (RSRP),
   Reference Signal Received Quality (RSRQ),
   drop call rate (DCR),
   traffic,
   number of users,
   Physical Resource Block (PRB) utilization,
   Channel Quality Indicator (CQI),
   carrier aggregation,
   advanced Quadrature Amplitude Modulation (QAM),
   radio resource control (RRC) users,
   downlink speed,
   uplink speed,
   network measurement,
   types of handsets,
   customer payment history,
   access failures,
   geographic locations of sectors in the set of sectors,
   number of sectors used,
   number of cell sites used,
   or any combination thereof.

5. The system of claim 1, wherein the weight for each telecommunications network usability indicator is computed using principal component analysis.

6. The system of claim 1, wherein the weights for telecommunications network usability indicators are computed to minimize interdependence of telecommunications network usability indicators in the set of telecommunications network usability indicators.

7. The system of claim 1, wherein the telecommunications network data for a geographic area is monitored at a cell level, and wherein the process further comprises aggregating the cell-level telecommunications network data into sector-level telecommunications network data.

8. The system of claim 1, wherein the set of network performance improvement solutions comprises:
   cell split,
   small cell deployment,
   spectrum addition,
   spectrum removal,
   sector addition,
   sector removal, or
   any combination thereof.

9. The system of claim 1, wherein the set of telecommunications network usability indicators comprises a top threshold number of telecommunications network usability indicators having a maximum correlation with customer experience.

10. The system of claim 1, wherein the set of telecommunications network usability indicators comprises telecommunications network usability indicators having low degrees of correlation with each other.

11. The system of claim 1, wherein the instructions, when executed by the at least one hardware processor, further perform a process comprising:
   classifying the geographic area as a detractor area, a passive area, or a promoter area using the computed overall telecommunications network usability score for the geographic area; and
   using the computed overall telecommunications network usability score for the geographic area to provide data for updating a current classification of the geographic area.

12. The system of claim 1, wherein the instructions, when executed by the at least one hardware processor, further perform a process comprising:
   for each telecommunications network usability indicator, projecting a change in value of the telecommunications network usability indicator if a network performance improvement solution were to be implemented in at least one network site or node in the geographic area, wherein the optimum network performance improvement solution is projected to provide a maximum positive change in values of a majority of the telecommunications network usability indicators.

13. The system of claim 1, wherein the instructions, when executed by the at least one hardware processor, further perform a process comprising:
   for each telecommunications network usability indicator, projecting a change in a number of users with a better experience if a network performance improvement solution were to be implemented in at least one network site or node in the geographic area,
  wherein the optimum network performance improvement solution is projected to provide a maximum positive change in values of a majority of the telecommunications network usability indicators.

14. The system of claim 1, wherein the geographic area is a sector, a cell site, a zip code, a city, a region, or a state.

15. A computer-implemented method for identifying geographic areas in which to improve telecommunications network congestion, the method comprising:
  monitoring telecommunications network data for a geographic area;
  extracting, from the telecommunications network data, values of a set of telecommunications network usability indicators,
    wherein the telecommunications network usability indicators in the set of telecommunications network usability indicators correspond to at least one of the following: telecommunications network coverage, quality of service, or data speed;
  computing, using the extracted values, score values of each telecommunications network usability indicator in the set of telecommunications network usability indicators;
  generating a weight for each telecommunications network usability indicator in the set of telecommunications network usability indicators;
  computing an overall telecommunications network usability score for the geographic area using the score values and the weights of the telecommunications network usability indicators in the set of telecommunications network usability indicators; and
  using the computed overall telecommunications network usability score for the geographic area to provide data for selecting an optimum network performance improvement solution from a set of network performance improvement solutions to be implemented in at least one network site or node in the geographic area.

16. The method of claim 15 further comprising:
  classifying the geographic area as a detractor area, a passive area, or a promoter area using the computed overall telecommunications network usability score for the geographic area.

17. The method of claim 15 further comprising:
  for each telecommunications network usability indicator, projecting a change in a number of users with a better experience if a network performance improvement solution were to be implemented in at least one network site or node in the geographic area,
    wherein the optimum network performance improvement solution is projected to provide a maximum positive change in values of a majority of the telecommunications network usability indicators.

18. At least one non-transitory, computer-readable medium carrying instructions, which, when executed by at least one data processor, perform operations for identifying geographic areas in which to improve telecommunications network congestion, the operations comprising:
  evaluating, for a geographic area, a current telecommunications network usability score;
  computing a current number of customers in the geographic area having an experience type,
    wherein the experience type is a detractor experience, a passive experience, or a promoter experience;
  identifying one or more network performance improvement solutions to be implemented in at least one network site or node in the geographic area;
  evaluating, for a geographic area, a projected telecommunications network usability score after the one or more network performance improvement solutions are implemented;
  displaying, at a graphical user interface, the current telecommunications network usability score for the geographic area and the projected telecommunications network usability score for the geographic area; and
  displaying, at the graphical user interface, an interactive map of the geographic area,
    wherein the interactive map further displays indicators depicting the customers in the geographic area and the associated experience type.

19. The at least one non-transitory, computer-readable medium of claim 18, wherein the operations further comprise:
  computing a projected number of customers in the geographic area having an updated experience type after the one or more network performance improvement solutions are implemented; and
  in response to a user selection of a projected view, updating the interactive map further to indicators depicting the customers in the geographic area and the associated updated experience type.

20. The at least one non-transitory, computer-readable medium of claim 18, wherein the operations further comprise:
  displaying, at the graphical user interface, information indicating a type of network problem in the geographic area and a proportion of customers impacted by the type of network problem.

* * * * *